United States Patent
Nieuwoudt

(12) 
(10) Patent No.: US 8,500,105 B2
(45) Date of Patent: Aug. 6, 2013

(54) CONTACT TRAY AND METHOD EMPLOYING SAME

(75) Inventor: Izak Nieuwoudt, Wichita, KS (US)

(73) Assignee: Koch-Glitsch, LP, Wichita, KS (US)

( * ) Notice: Subject to any disclaimer, the term of this patent is extended or adjusted under 35 U.S.C. 154(b) by 0 days.

(21) Appl. No.: 13/346,967

(22) Filed: Jan. 10, 2012

(65) Prior Publication Data

US 2012/0175792 A1    Jul. 12, 2012

Related U.S. Application Data

(60) Provisional application No. 61/431,271, filed on Jan. 10, 2011.

(51) Int. Cl.
*B01F 3/04*    (2006.01)

(52) U.S. Cl.
USPC .................. 261/79.2; 261/114.2; 261/114.5; 95/187; 95/198; 55/396; 55/457; 55/466

(58) Field of Classification Search
USPC ............... 55/396, 457, 466; 261/79.2, 114.2, 261/114.5; 95/187, 198
See application file for complete search history.

(56) References Cited

U.S. PATENT DOCUMENTS

| | | | |
|---|---|---|---|
| 4,603,022 A | | 7/1986 | Yoneda et al. |
| 5,626,799 A | * | 5/1997 | Sheinman .................... 261/79.2 |
| 2004/0080059 A1 | | 4/2004 | Weiland et al. |
| 2004/0130041 A1 | | 7/2004 | Resetarits et al. |
| 2004/0206289 A1 | | 10/2004 | Pollack et al. |
| 2006/0244159 A1 | | 11/2006 | White et al. |
| 2010/0039881 A1 | | 2/2010 | Nieuwoudt et al. |

OTHER PUBLICATIONS

Search Report and Written Opinion dated Sep. 3, 2012, in International Patent Application No. PCT/US2012/020742; International Filing Date: Jan. 10, 2012; Applicant: Koch-Glitsch, LP.

* cited by examiner

*Primary Examiner* — Robert A Hopkins
(74) *Attorney, Agent, or Firm* — Hovey Williams LLP

(57) ABSTRACT

A contact tray is provided with a tray deck and dividing walls which form groupings of one or more cans and one or more downcomer inlets distributed across the tray deck. The cans have walls that surround vapor openings in the tray deck that permit upward passage of a vapor stream into the cans. Downcomers extend downwardly from the downcomer inlet and are positioned for delivering a liquid stream into the center of cans positioned on a tray deck of an underlying contact tray. Discharge openings are provided in the walls of the cans to allow the liquid stream to exit the cans. The dividing walls direct the exiting liquid stream into the downcomer inlets in the same grouping and prevent or impede the liquid stream from flowing to a low side of the tray deck.

23 Claims, 7 Drawing Sheets

CONTACT TRAY AND METHOD EMPLOYING SAME

BACKGROUND OF THE INVENTION

The present invention relates generally to chemical processing columns in which mass transfer and/or heat exchange between fluid streams occurs and, more particularly, to contact trays used in such columns to facilitate contact between fluid streams flowing within the column and methods of contacting the fluid streams using the contract trays.

Contact trays are used within mass transfer and heat exchange columns to facilitate contact between fluid streams flowing in countercurrent relationship within the column. The fluid streams are typically an ascending vapor stream and a descending liquid stream, in which case the contact trays are commonly referred to as vapor-liquid contact trays. In some applications, both fluid streams are liquid streams and the contact trays are commonly referred to as liquid-liquid contact trays. In still other applications, the ascending fluid stream is a gas stream and the descending fluid steam is a liquid stream, in which case the contact trays are referred to as gas-liquid contact trays.

The contact trays each have a planar tray deck on and above which interaction between the ascending fluid stream and the descending fluid stream occurs, a plurality of openings to allow upward passage of the ascending fluid stream through the tray deck and into the descending fluid stream to create a froth or mixture in which the desired mass transfer and/or heat exchange occurs, and at least one downcomer that directs the descending fluid stream from the associated tray deck to a tray deck on an underlying contact tray. The contact trays are positioned within the column in vertically spaced-apart relationship with each of the tray decks extending horizontally to fill the entire internal cross-section of the column.

One type of vapor-liquid contact tray developed for high fluid flow capacity and high efficiency applications uses a plurality of cylindrical cans on the tray deck to enhance the mixing of the vapor and liquid streams. The cylindrical cans extend upwardly from the tray deck and surround vapor openings formed in the tray deck. Swirl vanes positioned within each cylindrical can impart a swirling motion to the vapor ascending within the cylindrical can. A downcomer directs liquid from an overlying tray into the center of each cylindrical can where it is picked up by the swirling vapor to cause vigorous vapor-liquid interaction that leads to high separation efficiency and subsequent disengagement of the liquid phase from the vapor phase.

The centrifugal force imparted to the liquid by the swirling vapor within the cylindrical can causes the liquid to splash against and rise along the inner wall surface of the cylindrical can. Openings in the inner wall surface allow the liquid to pass through the inner wall surface and then descend onto the tray deck. The liquid travels along the tray deck and enters an opening in the tray deck that forms an inlet to a downcomer that directs the liquid into a cylindrical can on an underlying contact tray. The swirling vapor exits the cylindrical can through an open top of the can and then ascends into and through an opening surrounded by a cylindrical can in the tray deck of an overlying contact tray. In this manner, the vapor stream ascends and the liquid stream descends from can to can in successive contact trays.

In mass transfer and heat exchange columns, the efficiency of the vapor-liquid or liquid-liquid interaction suffers significantly if the fluid streams are not uniformly distributed across the internal cross section of the column. Such maldistribution can occur when the contact trays are not horizontally aligned, causing the liquid stream to channel towards the low side of the trays and the vapor stream to channel toward the high side of the trays. As a result of this channeling, the desired intermixing of the liquid and vapor streams is not achieved and the efficiency of the interaction suffers. This problem can result from improper installation of the contact trays, when land-based columns sway under heavy wind loads, or when offshore columns are positioned on floating platforms, barges or ships and are subject to a rocking motion as a result of wind and wave action.

A need thus exists for apparatus and methods to reduce the maldistribution and channeling of fluid streams that can occur when columns are subjected to rocking or swaying motion or when the contact trays positioned within the columns are otherwise tilted out of a horizontal orientation, such as through improper installation.

SUMMARY OF THE INVENTION

In one embodiment, the present invention is directed to a contact tray for use in a column to facilitate mass transfer and/or heat exchange between fluid streams flowing in countercurrent relationship within the column. The column may be positioned on land or it may be positioned offshore, such as on a floating platform, barge or ship. The contact tray comprises a generally planar tray deck, a plurality of cans positioned on and extending upwardly from the tray deck, and vapor openings positioned in the tray deck within the walls of the cans to allow upward passage of a vapor stream through the tray deck and into the interior volume of the can. Each contact tray also has a plurality of downwardly-extending downcomers that extend into the cans on the underlying contact tray. Each downcomer includes an upper inlet opening formed in the tray deck to allow a portion of the liquid stream on the tray deck to enter and descend within the downcomer. Each downcomer also a lower outlet positioned within the can on the underlying contact tray to deliver the portion of the liquid stream from the overlying tray into the can for mixing with the vapor stream in the can. A liquid distributor can be positioned at the lower outlet of the downcomer to more uniformly feed the liquid to the vapor stream as the liquid exits from a vertically-misaligned downcomer.

The cans are formed by walls that are of cylindrical, polygonal or other desired shape and include discharge openings to permit the portion of the liquid stream within the can to exit the can after interacting with the vapor stream within the can. The can is open at the top to allow the vapor stream to exit the can after interacting with the liquid stream within the can.

Each contact tray includes dividing walls that extend upwardly from the tray deck and are positioned between the cans and the downcomer inlets in the tray deck. The dividing walls are arranged on the tray deck in a manner to form groupings of one or more cans and one or more downcomer inlets, with the one or more cans within each grouping being in liquid-flow communication with the one or more downcomer inlets within that grouping. The dividing walls also isolate each grouping of one or more cans and one or more downcomer inlets from the cans and downcomer inlets in the other groupings to prevent liquid-flow communication between the groupings. The dividing walls thus force all, or substantially all, of the liquid stream exiting from the one or more cans in each grouping to flow only into the one or more downcomer inlets within that same grouping. In this manner, the dividing walls prevent the maldistribution and channeling of the liquid stream that would otherwise result if the contact tray should be installed or subsequently become positioned in a non-horizontal orientation, such as a result of a column upset or by wind load or wave action on the column.

In another aspect, the invention is directed to a column for facilitating mass transfer and/or heat exchange between fluid streams flowing within the column. The column comprises an upright shell defining an open interior region and a plurality of contact trays of the type described above positioned in a generally horizontally-extending and vertically-spaced apart relationship in the open interior region of the shell.

In a further aspect, the present invention is directed to a method of using the contact trays described above to facilitate mass transfer and/or heat exchange between fluid streams flowing in countercurrent relationship within the column. The method comprises the steps of introducing a liquid stream into downcomers extending downwardly from a contact tray, delivering the liquid stream into cans positioned on an underlying contact tray, mixing the liquid stream with a swirling vapor stream rising within the cans to cause the mass transfer and/or heat exchange between the liquid and vapor streams. The method includes the additional steps of discharging the liquid streams from the cans through discharge openings in the can walls and using the dividing walls to direct all, or substantially all, of the discharged liquid stream from the one or more cans in each grouping to the one or more downcomer inlets in the same grouping.

DETAILED DESCRIPTION

Figure 1:
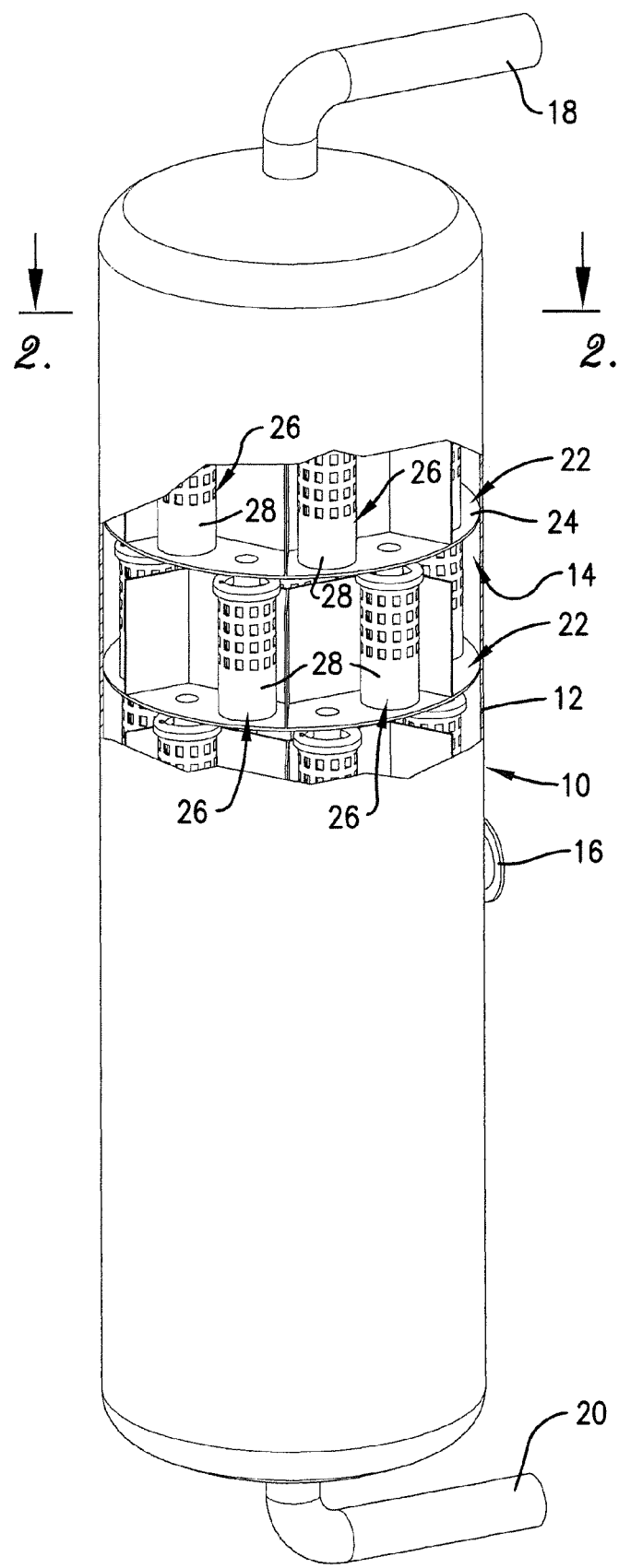
FIG. 1 is a perspective view of a column in which mass and/or heat transfer are intended to occur and in which portions of the column shell are broken away to show the contact trays of the present invention positioned within an open internal region within the column.

Turning now to the drawings in greater detail and initially to FIG. 1, a column suitable for use in processes in which mass transfer and/or heat exchange is intended to occur between countercurrent-flowing fluid streams is represented generally by the numeral 10. Column 10 includes an upright, external shell 12 that is generally cylindrical in configuration, although other configurations, including polygonal, are possible and are within the scope of the present invention. Shell 12 is of any suitable diameter and height and is constructed from one or more rigid materials that are desirably inert to, or are otherwise compatible with the fluids and conditions present during operation of the column 10.

Column 10 is of a type used for processing fluid streams, typically liquid and vapor streams, to obtain fractionation products and/or to otherwise cause mass transfer and/or heat exchange between the fluid streams. For example, column 10 can be one in which crude atmospheric, lube vacuum, crude vacuum, fluid or thermal cracking fractionating, coker or visbreaker fractionating, coke scrubbing, reactor off-gas scrubbing, gas quenching, edible oil deodorization, pollution control scrubbing, and other processes occur. The column 10 may be positioned on land or it may be positioned offshore on a floating platform, barge or ship.

The shell 12 of the column 10 defines an open internal region 14 in which the desired mass transfer and/or heat exchange between the fluid streams occurs. Normally, the fluid streams comprise one or more ascending vapor streams and one or more descending liquid streams. Alternatively, the fluid streams may comprise both ascending and descending liquid streams or an ascending gas stream and a descending liquid stream.

The fluid streams are directed to the column 10 through any number of feed lines 16 positioned at appropriate locations along the height of the column 10. One or more vapor streams can also be generated within the column 10 rather than being introduced into the column 10 through the feed lines 16. The column 10 will also typically include an overhead line 18 for removing a vapor product or byproduct and a bottom stream takeoff line 20 for removing a liquid product or byproduct from the column 10. Other column components that are typically present, such as reflux stream lines, reboilers, condensers, vapor horns, and the like, are not illustrated in the drawings because they are conventional in nature and an illustration of these components is not believed to be necessary for an understanding of the present invention.

A plurality of horizontally-extending contact trays 22 are positioned in vertically-spaced relationship within the open internal region 14 of the column 10. The trays 22 include a tray deck 24 that is normally constructed from a number of individual panels that are joined together in any of various known fashions. The tray deck 24 is intended to extend horizontally and fill all, or substantially all, of the internal cross section of the column 10.

Turning additionally to FIGS. 2-5, each of the contact trays 22 includes a plurality of upright cans 26 that are laid out in a preselected pattern and are supported on the tray deck 24. Each can 26 is formed by a wall 28 of a preselected height that is normally of a generally cylindrical configuration, although polygonal and other configurations could be used. Each wall 28 has a bottom edge that is secured to the tray deck 24 of the contact tray 22 in any suitable fashion, such as by welding or by tabs (not shown) that extend downwardly from the bottom edge of the wall 28 and are inserted through slots (not shown) formed in the tray deck 24. The tabs may then be bent against an underside of the tray deck 24 to secure the can 26 to the tray deck 24.

The height of the wall 28 of each can 26 is less than the vertical spacing between adjacent contact trays 22 so that the top edge of each wall 28 is spaced a preselected distance below the overlying contact tray 22 to allow the vapor stream to exit through an open top of the cans 26. Normally, the height of the walls 28 is at least one-half, or more preferably at least two-thirds, of the vertical spacing between adjacent contact trays 22. Each wall 28 is normally the same height as the other walls 28 of the cans 26 on the same contact tray 22, but the walls 28 can be of varying height if desired for particular applications. The height of the walls 28 of the cans 26 on one contact tray 22 may be the same as or different from the height of the walls 28 of the cans 26 on other contact trays 22.

The contact trays 22 also include vapor openings 30 formed in the tray deck 24 to allow the ascending vapor stream to pass upwardly through the tray deck 24. Normally, all, or substantially all, of the vapor openings 30 are positioned within the area enclosed by the walls 28 of the cans 26 so that all, or substantially all, of the vapor stream passing upwardly through the tray deck 24 is fed into the cans 26. A single, large vapor opening 30 may be enclosed by the wall 28 of each can 26, or multiple smaller vapor openings 30 may be enclosed by the wall 28 of each can 26. The number and diameter of the cans 26 and the size of the vapor openings 30 are selected to provide the desired vapor flow capacity and the desired volume for the intended vapor-liquid interaction within that portion of the column 10 in which the contact trays 22 are positioned.

One or more sets of swirlers 32 are positioned to cause centrifugal swirling of the vapor within each can 40. One set of swirlers 32a is normally positioned in each vapor opening 30 in or near the plane of the tray deck 24 so that a swirling motion is induced in the vapor stream as it passes upwardly through the tray deck 24 and enters the cans 26. Another set of swirlers 32b may be located within each can 26 at a position spaced a preselected distance above the lower swirlers 32a.

Each set of swirlers 32 comprises a plurality of radially-extending planar or curved vanes 34. The vanes 34 in the lower swirlers 32a may be shaped and/or angled the same as or differently from the vanes 34 in the upper swirlers 32b. As one example, the vanes 34 in the lower swirlers 32a may be curved to provide a gradual transition for the vapor stream from a vertical flow direction to one with a substantial radial flow vector. Because the vanes 34 in the upper swirlers 32b are presented with the vapor stream flowing with the radial flow vector, the vanes 34 in the upper swirlers 32b may be planar or formed with less of a curve in comparison to the vanes 34 in the lower swirlers 32a.

The swirlers 32 may be oriented so that the vapor swirls in the same rotational direction in each can 26 on each tray deck 24. Alternatively, the direction of vapor rotation in some cans 26 may be different from that in other cans 26. For example, the vapor rotation may be clockwise in each can 26 on one tray deck 24 and counterclockwise in each can 26 on an adjacent tray deck 24. As another example, the direction of vapor rotation may be clockwise in some cans 26 on one tray deck 24 and counterclockwise in the other cans 26 on the same tray deck 24.

The cans 26 each include a plurality of discharge openings 38 in the walls 28 of the cans 26 to permit the liquid stream within the cans 26 to exit the cans 26 following interaction with the swirling vapor stream in the cans 26. The discharge openings 38 can be of various forms, such as simple holes, directional louvers that extend into the cans 26 as illustrated in the drawings, and outwardly bent tabs (not shown) that are angled downwardly to deflect exiting liquid in a downward direction toward the tray deck 24. Other embodiments of the discharge openings 38 are contemplated by and are within the scope of the present invention.

A downturned lip ring 40 is positioned at the top of each can 26 to capture any portion of the liquid stream that exits along the top edge of the wall 28 of the can 26 and redirect the captured liquid outside of the can 26 and downwardly toward the tray deck 24. The lip ring 40 has an inner segment 42 that is positioned inwardly of the wall 28 of the associated can 26, a curved upper segment 44 spaced slightly above the top edge of the wall 28, and an outer segment 46 that is positioned outside of the wall 28 of the can 26. The lip ring 40 is held in place by tabs 48 that extend upwardly from the top edge of the wall 28 and are received within slots 50 in the upper segment 44 of the lip ring 40.

The contact trays 22 also include a plurality of downcomers 52 that extend downwardly from each tray deck 24 to deliver the descending liquid stream from each contact tray 22 to an underlying contact tray 22. Each downcomer 52 extends downwardly into one of the cans 26 on the tray deck 24 of the underlying contact tray 22. The downcomers 52 may be aligned with the cans 26 into which they deliver the liquid stream on the underlying contact tray 22. Alternative, the downcomers 52 may be offset from the cans 26 into which they deliver the liquid stream to allow greater flexibility in the layout of the downcomers 52 and the cans 26 on the tray decks 24.

In one embodiment, only one downcomer 52 extends into each can 26 and is centrally positioned within the associated can 26. In other embodiments, more than one downcomer 52 extends into each can 26. Each downcomer 52 has an upper downcomer inlet 54 formed as an opening in the tray deck 24 and a lower discharge outlet 56 positioned within the associated, underlying can 26. An optional weir (not shown) may surround each downcomer inlet 54 to cause the liquid stream to accumulate to a preselected level on the tray deck 24 before spilling over the weir and entering the downcomer 52. The lower discharge outlet 56 may include structure to disrupt the downward momentum of the liquid stream as it exits the discharge outlet 44. Alternatively or additionally, an imperforate seal pan 58 may be positioned below the discharge outlet 44 to impede the discharged liquid stream from weeping downwardly through the vapor openings 30.

In accordance with the present invention, dividing walls 60 extend upwardly from the tray deck 24 on each contact tray 22 and are positioned to form multiple zones or groupings containing one or more cans 26 and one or more downcomer inlets 54. The dividing walls 60 are formed as multiple segments that are joined together to form an interconnected web that circumscribes and isolates the cans 26 and downcomer inlets 54 in each grouping from those in the other groupings. The individual segments of the dividing walls 60 may be planar as illustrated in the drawings, or they may be curved or any other desired configuration. The dividing walls 60 may be positioned to form groupings in which only a single can 26 and a single downcomer inlet 54 are present within each grouping, or two or more cans 26 and two or more downcomer inlets 54 may be included within each grouping. In one embodiment, equal numbers of cans 26 are included within each grouping and equal numbers of downcomer inlets 54 are included within each grouping. In another embodiment, some groupings may include more cans 26 and downcomer inlets 54 than other groupings.

Each grouping of the one or more cans 26 and the one or more downcomer inlets 54 is isolated by the dividing walls 60 from the other groupings of cans 26 and downcomer inlets 54 so that the liquid stream is unable to flow, or is substantially impeded from flowing, between the groupings. The dividing walls 60 thus force all, or substantially all, of the liquid stream exiting from the one or more cans 26 in each grouping to flow only into the one or more downcomer inlets 54 within that same grouping.

Figure 2:
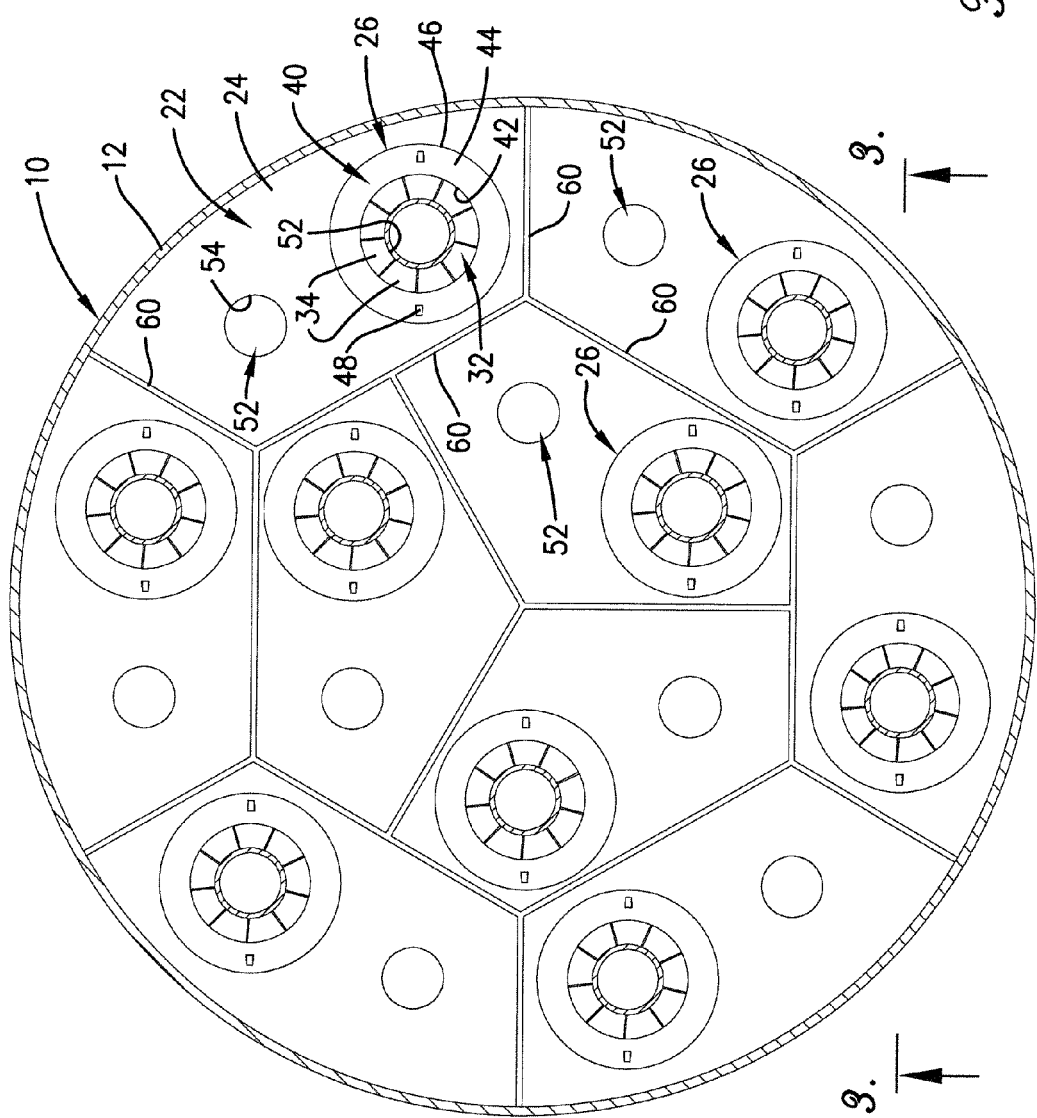
FIG. 2 is an enlarged, top plan view of the column taken in horizontal section along line 2-2 of FIG. 1 in the direction of the arrows and showing one of the contact trays of the present invention.
Figure 3:
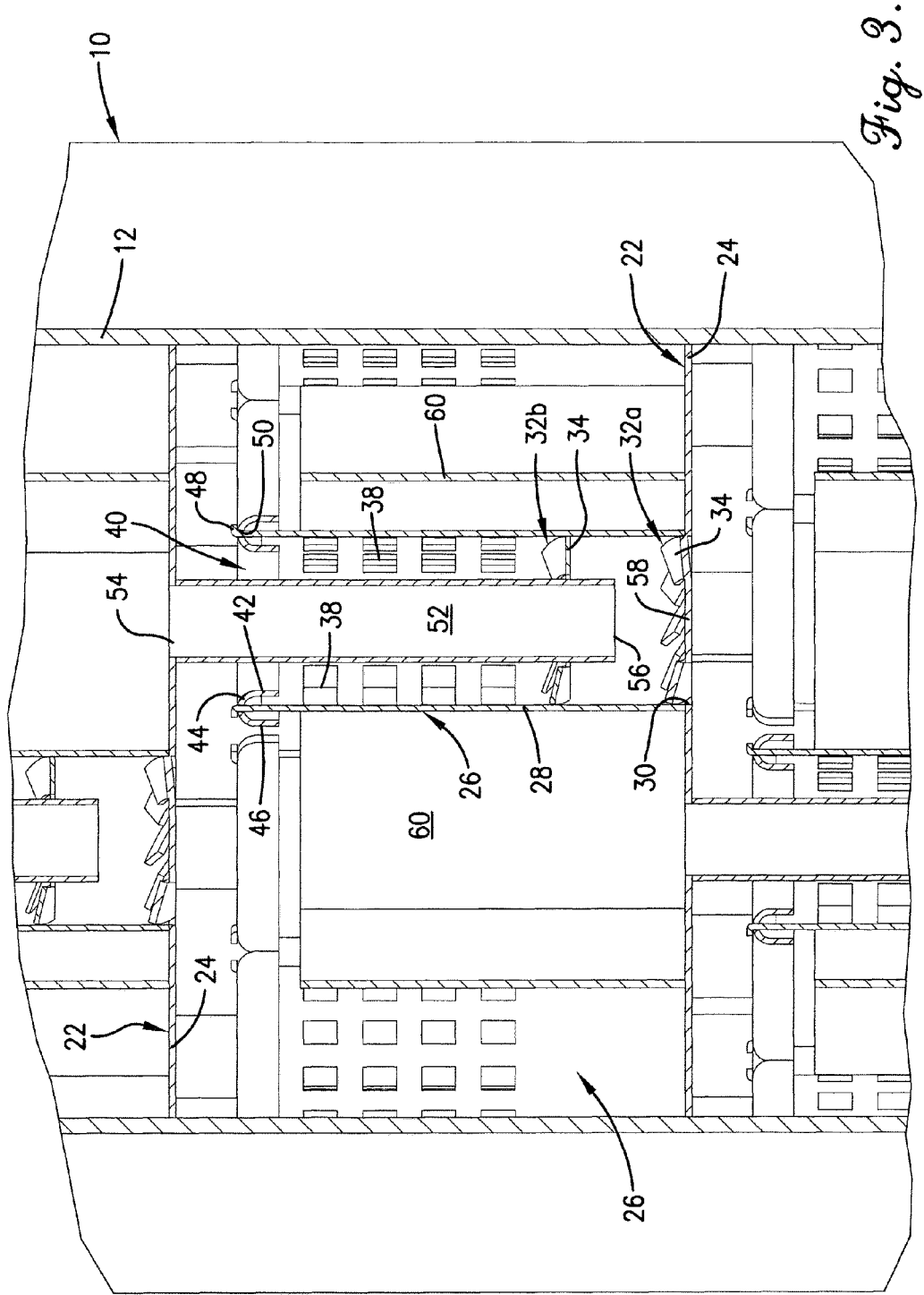
FIG. 3 is an enlarged, fragmentary, side elevation view of the column shown in FIG. 1 and taken in vertical section to show details of the contact trays within the column.
Figure 4:
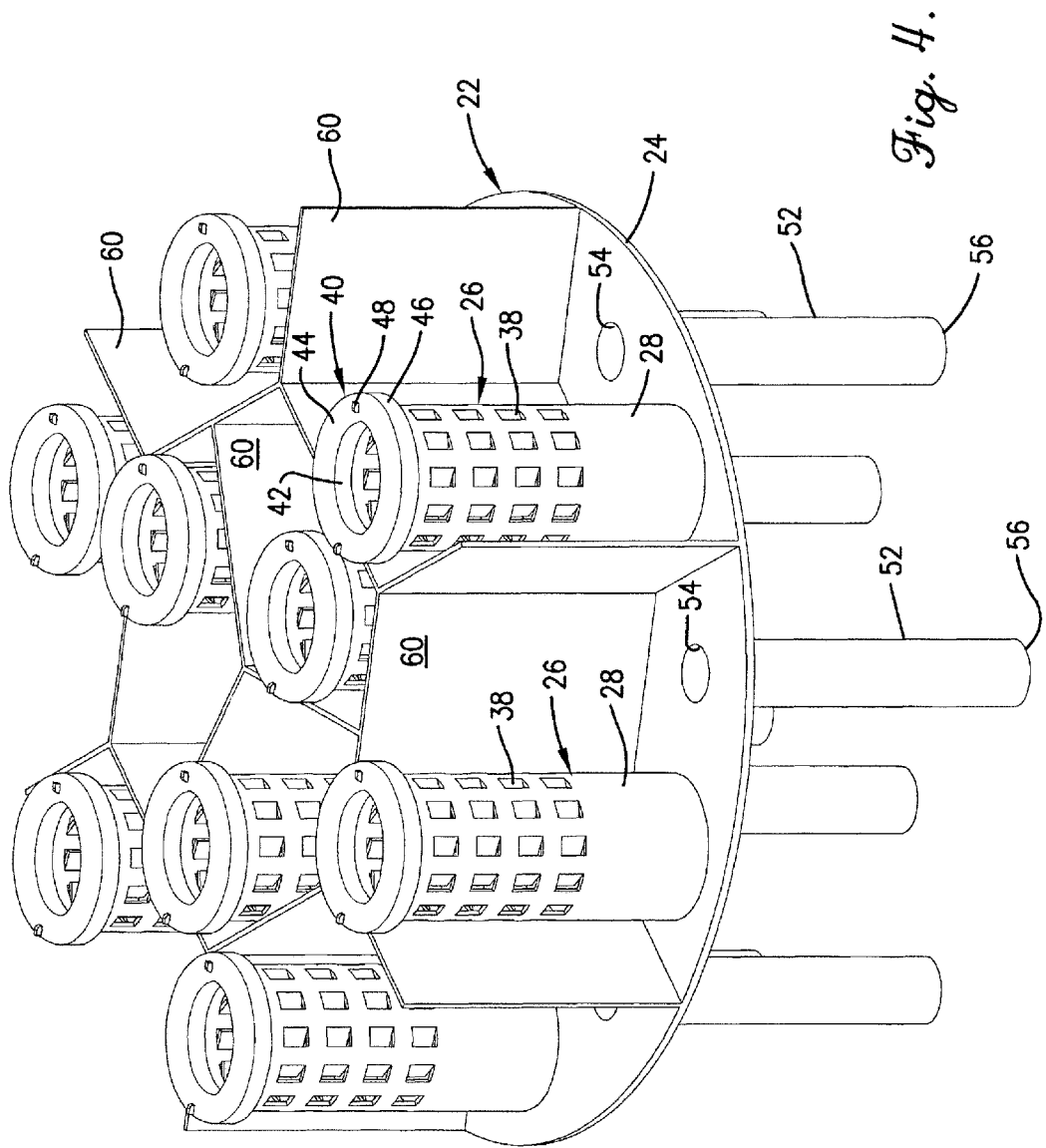
FIG. 4 is an enlarged, perspective view of one of the contact trays shown in FIG. 1.
Figure 5:
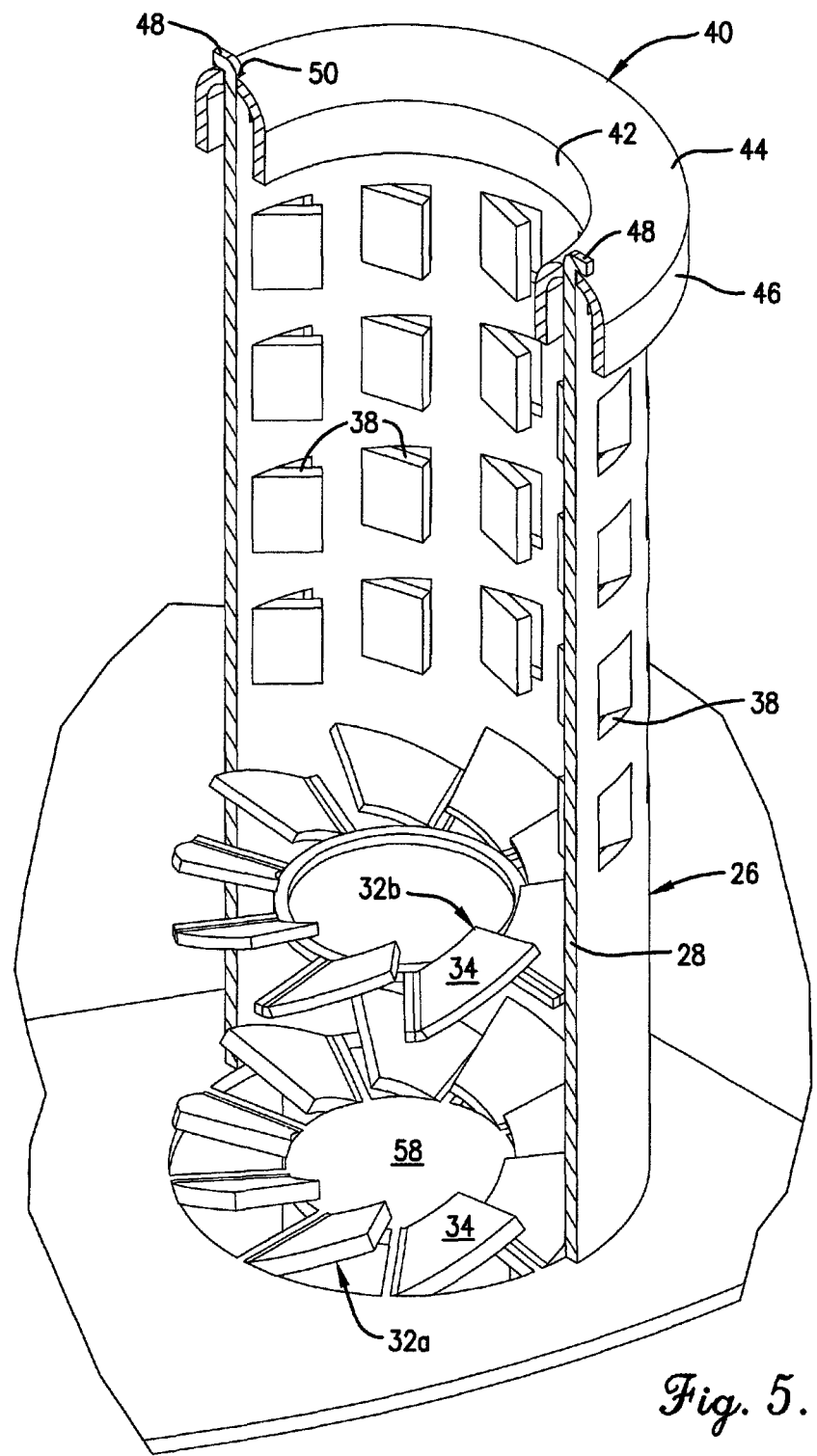
FIG. 5 is a further-enlarged, perspective view of a fragmental portion of one of the cans forming part of the contact trays.

As can best be seen in FIG. 2, the dividing walls 60 are preferably arranged to enclose roughly equal surface areas of the tray deck 24 within each grouping of cans 26 and downcomer inlets 54. The dividing walls 60 also extend upwardly a sufficient distance above the tray deck 24 to block all, or substantially all, of the liquid stream exiting each grouping of cans 26 from flowing to any of the other groupings of cans 26 on the same contact tray 22. The top edge of the dividing walls 60 should thus normally be positioned above the uppermost discharge openings 38 formed in the walls 28 of the cans 26. The dividing walls 60 may extend upwardly a sufficient distance to place the top edge of the dividing walls 60 into contact with the overlying tray deck 24 to provide additional support for the tray deck 24 and to ensure proper spacing between adjacent tray decks 24. If the dividing walls 60 contact the overlying tray deck 24, vapor openings (not shown) may be provided near the top edge of the dividing walls 60 to allow the vapor stream to pass through the dividing walls 60 to equalize the pressure across the cross section of the column 10. The liquid discharge openings 38 in the walls 28 of the cans 26 may be arrayed around the circumference of the cans 26, as illustrated in the drawings, or they may be concentrated in one or more locations, such as in the portion of the walls 28 closest to the associated downcomer inlet 54.

By blocking or substantially impeding the flow of the liquid stream between the different groupings of cans 26 and downcomer inlets 54, the dividing walls 60 force the liquid stream exiting the one or more cans 26 in each grouping to flow into the one or more downcomer inlets 54 in the same grouping. If the tray deck 24 of the contact tray 22 should be misaligned from a horizontal orientation, the liquid stream would normally flow toward the low side of the tray deck 24 and concentrate in those downcomer inlets 54 positioned at the low side of the tray deck 24. This channeling of the liquid stream toward the low side of the tray deck 24 reduces the liquid flow capacity of the contact tray 22 and decreases the interaction between the liquid and vapor streams, thereby reducing the mass transfer and heat exchange efficiency of the contact tray 22. The dividing walls 60 prevent the liquid stream from flowing across the tray deck 24 and force roughly equal portions of the liquid stream to enter each downcomer inlet 54 even if the tray deck 24 should be misaligned from a horizontal orientation. It can thus be seen that the dividing walls 60 prevent the undesirable maldistribution and channeling of the liquid stream that would otherwise result if the contact tray 22 should be installed or subsequently become positioned in a non-horizontal orientation, such as a result of a column upset or by wind load or wave action on the column 10.

Figure 6:
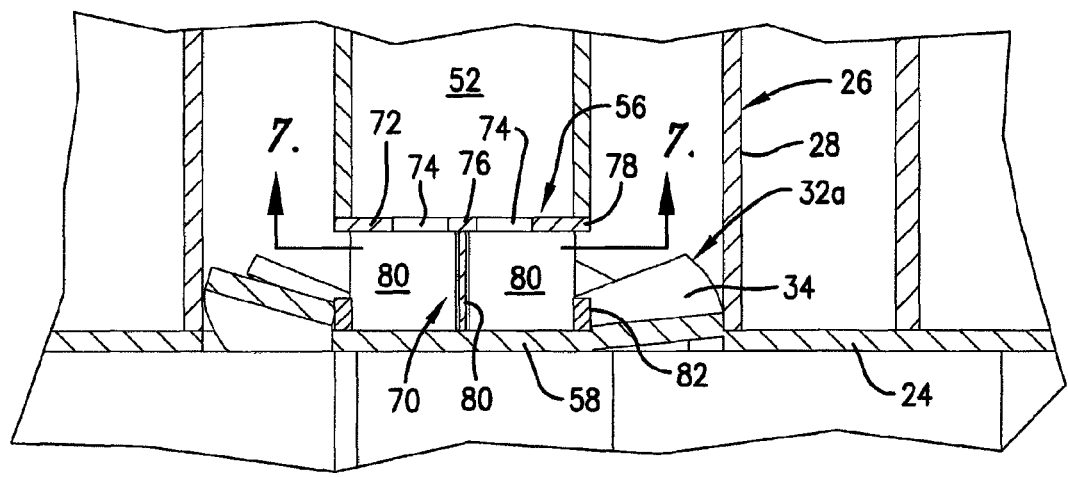
FIG. 6 is a fragmentary, side elevation view of one of the contact trays showing an embodiment of a liquid distributor positioned at the downcomer outlet of one of the cans.
Figure 7:
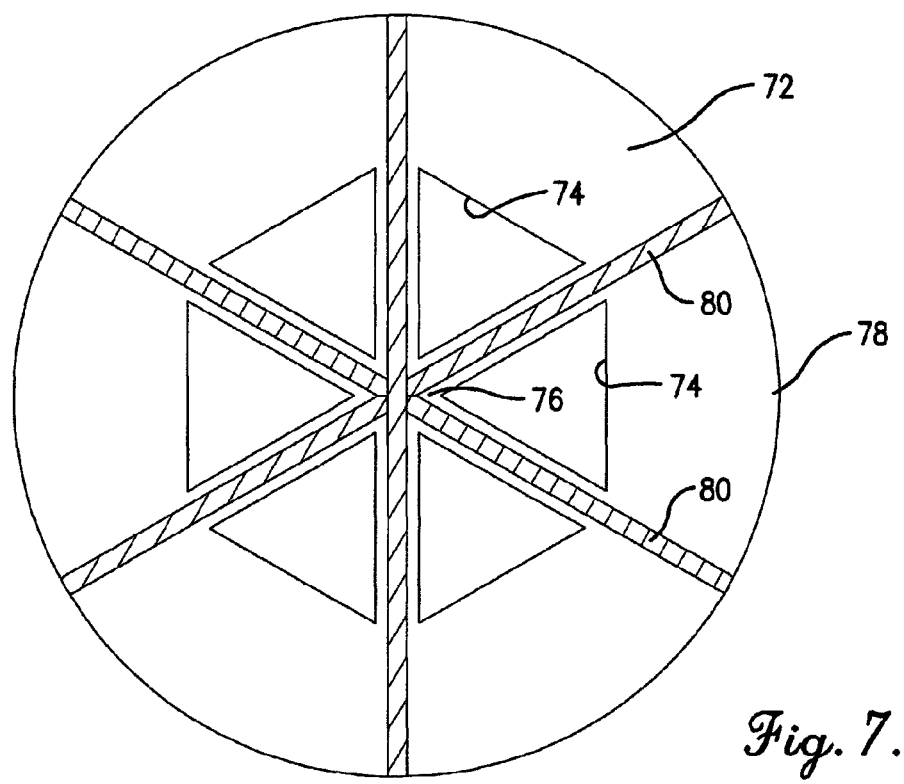
FIG. 7 is an enlarged bottom plan view of the liquid distributor shown in FIG. 6, taken in horizontal section along line 7-7 in the direction of the arrows.

Turning to FIGS. 6-7, the present invention is also directed to a liquid distributor 70 positioned at the outlet 56 of some or all of the downcomers 52 to more uniformly distribute the liquid as it exits the downcomers 52 within the cans 26 when the contact tray 22 is positioned in a non-horizontal orientation. The liquid distributor 70 comprises a generally planar floor plate 72 that extends transversely across and closes the downcomer outlet 56. The floor plate 72 may be welded or otherwise secured to the wall forming the downcomer 52. The floor plate 72 includes a plurality of openings 74 located within a central region 76, leaving an annular region 78 surrounding said central region 76 completely or largely free of such openings 74. The openings 74 may be triangular as illustrated in FIG. 7, or they may be round, square, oval or other configurations. The number, size, and spacing of the openings 74 are selected to accommodate the designed volumetric flow of descending liquid in the downcomer 52 while causing some liquid backup in the downcomer 52. The liquid backup and the central positioning of the openings 74 ensures that liquid is fed to each of the openings 74 even though the downcomer 52 is inclined at an angle to the vertical as a result of misalignment of the downcomer 52 and/or the associated contact tray 22. By feeding the liquid to each of the openings 74 in this manner, the liquid is more uniformly and centrally discharged even when the downcomer 52 is inclined.

The liquid distributor 70 also includes a plurality of baffle walls 80 that extend downwardly from the floor plate 72 to the seal pan 58 or tray deck 24 to further reduce the opportunity for maldistribution of liquid exiting from the downcomers 52. The baffle walls 80 extend radially-outward from a notional, longitudinal center axis of the downcomer 52 a preselected radial distance at equal arc intervals to form roughly equal volumes between each pair of adjacent baffle walls 80. In one embodiment, the radial length of the baffle walls 80 is selected so that an outer edge of each baffle wall 80 is positioned in a vertical plane beyond the central region 76 and within the outer annular region 78 of the overlying floor plate 72. In another embodiment, the radial length of the baffle walls 80 is selected so that the outer edge of each baffle wall 80 abuts a ring-shaped inlet weir 82 extending upwardly from an outer perimeter of the seal pan 58.

One or more of the openings 74 feeds liquid into each of the volumes defined by the baffle walls 80. In the illustrated embodiment, a single triangular-shaped opening 74 feeds liquid in each of the volumes defined by the baffle walls 80. In other embodiments, a plurality of openings 74 feeds liquid into each volume. The liquid then flows outwardly from each volume between the baffle walls 80 and is picked up by the swirling vapor exiting from the swirler 28. The baffle walls 80 impede the liquid from flowing to a low side of the seal pan 58 and ensure a more uniform circumferential distribution of the liquid to the vapor exiting from the swirler 28.

Figure 8:
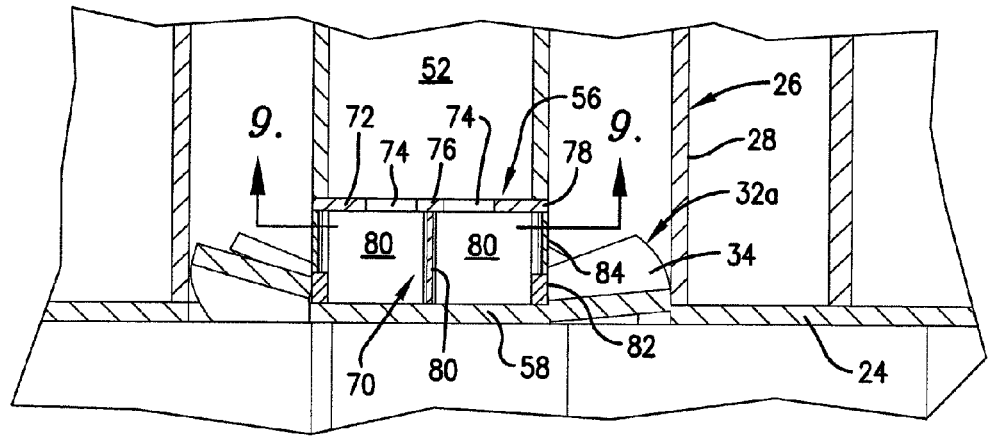
FIG. 8 is a fragmentary, side elevation view of one of the contact trays showing an alternate embodiment of the liquid distributor positioned at the downcomer outlet of one of the cans.
Figure 9:
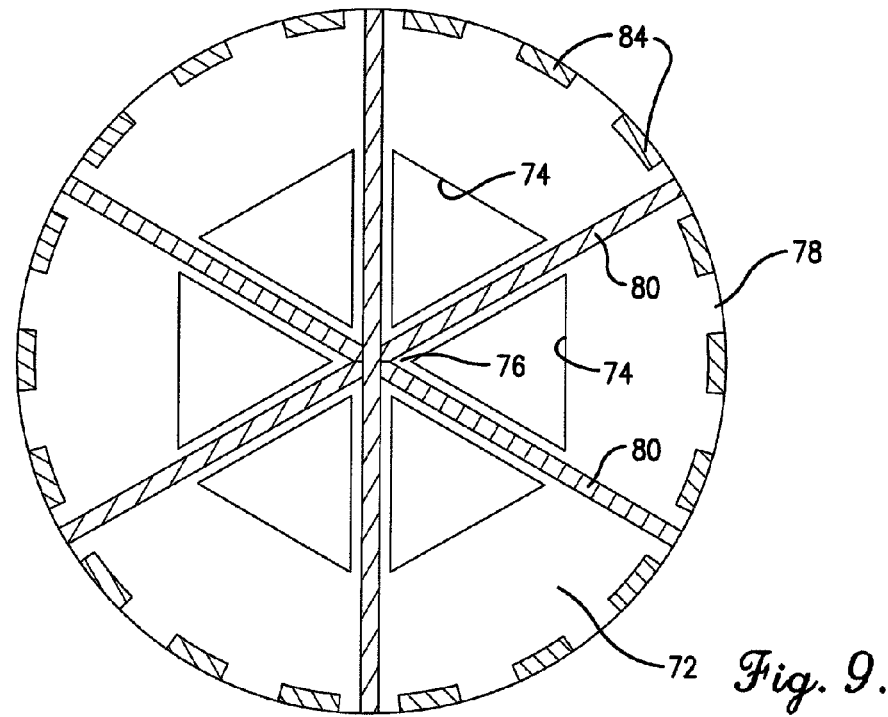
FIG. 9 is a bottom plan view of the liquid distributor shown in FIG. 8, taken in horizontal section along line 9-9 in the direction of the arrows.

The liquid distributor 70 can also include a plurality of circumferentially-spaced pickets 84 that extend upwardly from or adjacent the inlet weir 82 and are attached to the overlying floor plate 72, as shown in FIGS. 8-9.

During use of the column 10, a liquid stream flows into the downcomer inlets 54 and descends through the downcomers 52 before exiting through the discharge outlets 56 into the cans 26 on the underlying tray deck 24. The liquid entering the cans 26 is picked up by the vapor stream that enters the cans 26 through the vapor openings 30 in the tray deck 24. The swirlers 32 impart a centrifugal swirling motion to the vapor and liquid streams to cause intimate mixing of the vapor and liquid streams within the cans 26. The centrifugal forces acting on the liquid cause the liquid to be thrown against the inner surfaces of the walls 28 of the cans 26 where it rises until it encounters the discharge openings 38 in the walls 28. The liquid stream is then carried by a portion of the vapor stream through the discharge openings 38. The liquid stream exiting through the discharge openings 38 descends onto the tray deck 24 in the area circumscribed by the adjacent segments of the dividing walls 60. The remainder of the vapor stream exits through the open top of the cans 26 and moves laterally before ascending through the vapor openings 30 in the tray deck 24 of the overlying contact tray 22. Any portion of the liquid stream that bypasses the discharge openings 38 as it travels up the walls 28 of the cans 26 is captured by the lip rings 40 at the top edge of the walls 28 and is redirected downwardly onto the tray deck 24.

The liquid stream that exits the cans 26 after intermixing with the vapor stream falls onto the tray deck 24 and is routed in roughly equal portions by the dividing walls 60 into the one or more downcomer inlets 54 associated with the one or more cans 26 from which the liquid stream exited. The liquid stream is then directed downwardly by the downcomers 52 to the cans 26 positioned on the underlying contact tray 22. In this manner, the vapor stream and liquid stream interact within the cans 26 on each tray deck 24 before being delivered, respectively, to the next overlying and underlying contact trays 22 in the open internal region 14 of the column 10.

The present invention thus includes a method of operating the column 10 by delivering a first fluid stream downwardly through each of a plurality of downcomers 52 extending downwardly from one of said contact trays 22 and discharging the first fluid stream from said downcomers 52 into cans 26 positioned on a tray deck 24 on an underlying contact tray 22. The first fluid stream within the cans 26 is interacted with a swirling motion with a second fluid stream that ascends through the tray deck 24 of said underlying contact tray 22 and enters the cans 26. The first fluid stream is then removed from said cans 26 after interaction with said second fluid stream and is directed from the one or more cans 26 in each grouping and delivered to the one or more downcomer inlets 54 in the same grouping. The one or more dividing walls 60 serve to impede the delivery of the removed first fluid stream to downcomer inlets 54 in other ones of the groupings. The dividing walls 60 thus prevent the undesirable maldistribution and channeling of the liquid stream that would otherwise result if the contact tray 22 should be installed or subsequently become positioned in a non-horizontal orientation.

From the foregoing, it will be seen that this invention is one well adapted to attain all the ends and objectives hereinabove set forth together with other advantages that are inherent to the structure.

It will be understood that certain features and subcombinations are of utility and may be employed without reference to other features and subcombinations. This is contemplated by and is within the scope of the invention.

Since many possible embodiments may be made of the invention without departing from the scope thereof, it is to be understood that all matter herein set forth or shown in the accompanying drawings is to be interpreted as illustrative and not in a limiting sense.

What is claimed is:

1. A contact tray for facilitating contact between ascending and descending fluids within a column in which mass transfer and/or heat exchange processes occur, said contact tray comprising:
   a generally planar tray deck;
   a plurality of cans positioned on and extending upwardly from the tray deck, each of said cans having a generally open top and being formed by a wall of a preselected height, said wall having a plurality of discharge openings extending through the wall to allow fluid to pass through the wall from within the can;
   openings extending through the tray deck within areas circumscribed by each of the cans to allow fluid to pass upwardly through the tray deck and into the cans;
   swirlers positioned to cause centrifugal swirling of the fluid that has passed upwardly through the tray deck and into the cans;
   downcomers extending downwardly from the tray deck, each downcomer comprising an upper downcomer inlet formed in the tray deck and a lower discharge outlet;
   one or more dividing walls extending upwardly from the tray deck and positioned to form multiple groupings of one or more of said cans and one or more of said downcomer inlets, the one or more dividing walls isolating the one or more cans and the one or more downcomer inlets in each grouping from the cans and downcomer inlets in the other groupings so that said fluid passing through the wall from within the can in each grouping is impeded from flowing into downcomer inlets in other groupings by the one or more dividing walls.

2. The contact tray of claim 1, wherein said one or more dividing walls enclose roughly equal surface areas of the tray deck within each grouping of the cans and the downcomer inlets.

3. The contact tray of claim 2, wherein said one or more dividing walls extend upwardly to a level above that at which the discharge openings are positioned in the walls of the cans.

4. The contact tray of claim 3, wherein the walls of the cans are generally cylindrical in configuration.

5. The contact tray of claim 4, wherein the groupings of the one or more cans and the one or more downcomer inlets each have a same number of said cans.

6. The contact tray of claim 5, wherein the groupings of the one or more cans and the one or more downcomer inlets each have a same number of said downcomer inlets.

7. The contact tray of claim 3, wherein only one of said cans and one of said downcomer inlets is in each of the groupings of the one or more cans and the one or more downcomer inlets.

8. The contact tray of claim 3, wherein more than one of said cans and more than one of said downcomer inlets are in each grouping of the one or more cans and the one or more downcomer inlets.

9. A contact tray for facilitating contact between ascending and descending fluids within a column in which mass transfer and/or heat exchange processes occur, said contact tray comprising:
   a generally planar tray deck;
   a plurality of cans positioned on and extending upwardly from the tray deck, each of said cans having a generally open top and being formed by a wall of a preselected height, said wall having a plurality of discharge openings extending through the wall to allow fluid to pass through the wall from within the can;
   openings extending through the tray deck within areas circumscribed by each of the cans to allow fluid to pass upwardly through the tray deck and into the cans;
   swirlers positioned to cause centrifugal swirling of the fluid that has passed upwardly through the tray deck and into the cans;
   downcomers extending downwardly from the tray deck, each downcomer comprising an upper downcomer inlet formed in the tray deck and a lower discharge outlet;
   one or more dividing walls extending upwardly from the tray deck and positioned to form multiple groupings of one or more of said cans and one or more of said downcomer inlets, the one or more dividing walls isolating the one or more cans and the one or more downcomer inlets in each grouping from the cans and downcomer inlets in the other groupings so that said fluid passing through the wall from within the can in each grouping is impeded from flowing into downcomer inlets in other groupings by the one or more dividing walls; and
   a liquid distributor positioned at the lower discharge outlet of each of said downcomers, said liquid distributor comprising a floor plate extending across said lower discharge outlet and having openings positioned in a central region and being largely absent from an outer annular region that surrounds said central region and baffle walls that extend downwardly from said floor plate and outwardly from a notional, longitudinal center axis of said downcomer.

10. A column in which mass transfer and/or heat exchange processes occur, said column comprising:

an upright external shell that defines an open internal region;

a plurality of horizontally-extending contact trays positioned in vertically-spaced relationship within the open internal region, each of said contact trays comprising:

a generally planar tray deck;

a plurality of cans positioned in a preselected pattern on and extending upwardly from the tray deck, each of said cans having a generally open top and being formed by a wall of a preselected height which is less than a vertical spacing between adjacent ones of said contact trays, said wall having a plurality of discharge openings extending through the wall to allow fluid to pass outwardly through the wall from within the can;

openings extending through the tray deck within each of the cans to allow fluid to pass upwardly through the tray deck and into the cans;

swirlers positioned to cause centrifugal swirling of the fluid that has passed upwardly through the tray deck and into the cans;

downcomers extending downwardly from the tray deck and comprising an upper downcomer inlet formed in the tray deck and a lower discharge outlet positioned within a can on an underlying contact tray;

one or more dividing walls extending upwardly from the tray deck and positioned to form multiple groupings of said cans and downcomer inlets which are circumscribed by said one or more dividing walls, the one or more dividing walls isolating the cans and downcomer inlets in each grouping from the cans and downcomer inlets in the other groupings so that said fluid passing outwardly through the wall from within the can in each grouping is impeded from flowing into said downcomer inlets in other groupings by the one or more dividing walls.

11. The column of claim 10, wherein said one or more dividing walls enclose roughly equal surface areas of the tray deck within each grouping of the cans and the downcomer inlets.

12. The column of claim 11, wherein said one or more dividing walls extend upwardly to a level above that at which the discharge openings are positioned in the walls of the cans.

13. The column of claim 12, wherein the walls of the cans are generally cylindrical in configuration.

14. The column of claim 13, wherein equal numbers of cans are in each of the groupings of the cans and the downcomer inlets.

15. The column of claim 14, wherein equal numbers of downcomer inlets are in each of the groupings of the cans and the downcomer inlets.

16. The column of claim 12, wherein only one of said cans and one of said downcomer inlets is in each grouping of the cans and the downcomer inlets.

17. The column of claim 12, wherein more than one of said cans and more than one of said downcomer inlets are in each grouping of the cans and the downcomer inlets.

18. A column in which mass transfer and/or heat exchange processes occur, said column comprising:

an upright external shell that defines an open internal region;

a plurality of horizontally-extending contact trays positioned in vertically-spaced relationship within the open internal region, each of said contact trays comprising:

a generally planar tray deck;

a plurality of cans positioned in a preselected pattern on and extending upwardly from the tray deck, each of said cans having a generally open top and being formed by a wall of a preselected height which is less than a vertical spacing between adjacent ones of said contact trays, said wall having a plurality of discharge openings extending through the wall to allow fluid to pass outwardly through the wall from within the can;

openings extending through the tray deck within each of the cans to allow fluid to pass upwardly through the tray deck and into the cans;

swirlers positioned to cause centrifugal swirling of the fluid that has passed upwardly through the tray deck and into the cans;

downcomers extending downwardly from the tray deck and comprising an upper downcomer inlet formed in the tray deck and a lower discharge outlet positioned within a can on an underlying contact tray;

one or more dividing walls extending upwardly from the tray deck and positioned to form multiple groupings of said cans and downcomer inlets which are circumscribed by said one or more dividing walls, the one or more dividing walls isolating the cans and downcomer inlets in each grouping from the cans and downcomer inlets in the other groupings so that said fluid passing outwardly through the wall from within the can in each grouping is impeded from flowing into said downcomer inlets in other groupings by the one or more dividing walls; and a liquid distributor positioned at the lower discharge outlet of each of said downcomers, said liquid distributor comprising a floor plate extending across said lower discharge outlet and having openings positioned in a central region and being largely absent from an outer annular region that surrounds said central region and baffle walls that extend downwardly from said floor plate to the tray deck of an underlying contact tray, said baffle walls extending outwardly from a notional, longitudinal center axis of said downcomer.

19. A method of operating a column comprising an upright external shell that defines an open internal region and a plurality of horizontally-extending contact trays positioned in vertically-spaced relationship within the open internal region, each of said contact trays comprising a tray deck, a plurality of cans extending upwardly from the tray deck, a plurality of downcomers extending downwardly from the tray deck and having a downcomer inlet at said tray deck, and one or more dividing walls extending upwardly from the tray deck and positioned to form multiple groupings of one or more of said cans and one or more of said downcomer inlets, each of said groupings being circumscribed by said one or more dividing walls, said method comprising the steps of:

delivering a first fluid stream downwardly through each of a plurality of downcomers extending downwardly from one of said contact trays and discharging the first fluid stream from said downcomers into cans positioned on a tray deck on an underlying contact tray;

interacting with a swirling motion the first fluid stream within the cans with a second fluid stream that ascends through the tray deck of said underlying contact tray and enters the cans;

removing said first fluid stream from said cans after interaction with said second fluid stream; and directing said removed first fluid stream from the one or more cans in each grouping and delivering it to the one or more downcomer inlets in the same grouping, said one or more dividing walls impeding the delivery of the removed first fluid stream to downcomer inlets in other ones of the groupings.

20. The method of claim 19, wherein said first fluid stream is a liquid stream and said second fluid stream is a vapor stream.

21. The method of claim 19, wherein said first fluid stream is a liquid stream and said second fluid stream is a gas stream.

22. The method of claim 19, wherein said first fluid stream is a liquid stream and said second fluid stream is another liquid stream.

23. A contact tray for facilitating contact between ascending and descending fluids within a column in which mass transfer and/or heat exchange processes occur, said contact tray comprising:

a generally planar tray deck;

a plurality of cans positioned on and extending upwardly from the tray deck, each of said cans having a generally open top and being formed by a wall of a preselected height, said wall having a plurality of discharge openings extending through the wall to allow fluid to pass through the wall from within the can;

openings extending through the tray deck within areas circumscribed by each of the cans to allow fluid to pass upwardly through the tray deck and into the cans;

swirlers positioned to cause centrifugal swirling of the fluid that has passed upwardly through the tray deck and into the cans;

downcomers extending downwardly from the tray deck, each downcomer comprising an upper downcomer inlet formed in the tray deck and a lower discharge outlet;

a liquid distributor positioned at the lower discharge outlet of each of said downcomers, said liquid distributor comprising a floor plate extending across said lower discharge outlet and having openings positioned in a central region and being largely absent from an outer annular region that surrounds said central region and baffle walls that extend downwardly from said floor plate and outwardly from a notional, longitudinal center axis of said downcomer.

* * * * *